United States Patent [19]
Higashino

[11] 3,710,228
[45] Jan. 9, 1973

[54] BATTERY CHARGING ARRANGEMENT

[75] Inventor: Toshimitsu Higashino, Japan

[73] Assignee: Nippondenso Kabushiki Kaisha, Aichi Ken, Japan

[22] Filed: March 19, 1971

[21] Appl. No.: 125,947

[30] Foreign Application Priority Data

March 20, 1970 Japan .................................45/23835

[52] U.S. Cl. .......................320/61, 320/72, 322/90, 322/94
[51] Int. Cl..................................................H02j 7/14
[58] Field of Search...........................320/28-30, 71, 320/72; 322/7, 8, 89-94

[56] References Cited

UNITED STATES PATENTS

| | | | |
|---|---|---|---|
| 2,898,542 | 8/1959 | Wasko et al. | 322/93 X |
| 3,508,138 | 4/1970 | Schatz | 322/94 |

*Primary Examiner*—J. D. Miller
*Assistant Examiner*—Robert J. Hickey
*Attorney*—Michael S. Striker

[57] ABSTRACT

A three-phase generator charges a battery under high and low load conditions through a bridge rectifier. The windings of the A.C. generator are connected in a Y connection when the system under high load and in series when the system is under low load.

4 Claims, 1 Drawing Figure

PATENTED JAN 9 1973
3,710,228
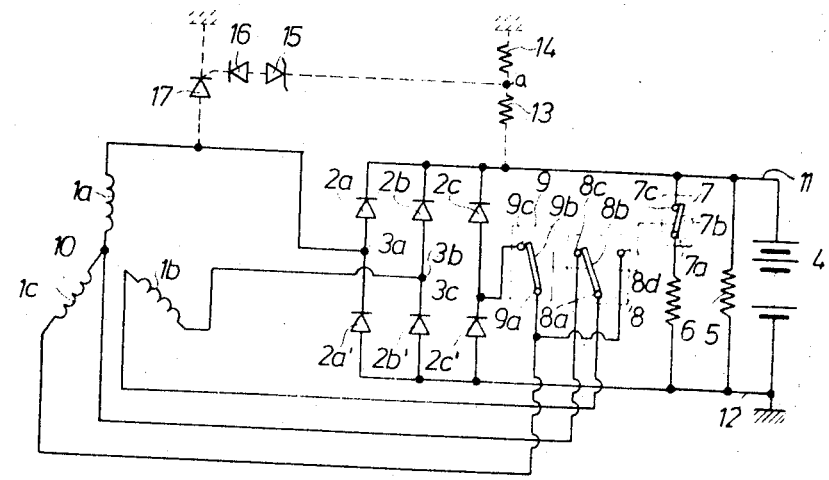
INVENTOR
Toshimitsu HIGASHINO
By
his ATTORNEY

BATTERY CHARGING ARRANGEMENT

BACKGROUND OF THE INVENTION

This invention relates to a battery charging arrangement having an A.C. generator, a rectifier arrangement and the battery. Normally for light vehicles, battery charging arrangements with single-phase permanent magnet generators are used. In order to prevent excessive rise in voltage under varying load conditions, switching means are used which cause only a part of the current generating winding of the generator to be used as an output winding under low load conditions, while under higher loads, as for example by night, the whole winding is used. However, in the last few years the requirements on the power output of these generators has increased, while a smaller size has become more and more desirable. Therefore in general, three-phase alternators are used today. The use of these three-phase alternators not only decreases the A.C. component of the D.C. current supplied by the generator through the rectifier, but also results in a higher efficiency. Thus for the same power output, a smaller generator may be used.

However, when a permanent magnet generator is used, difficulties arise in regulating the output voltage. This output voltage varies within every wide limits since the generator is under constant excitation but subjected to large variations in speed. Thus, generally speaking, voltage regulators are used for regulating the output voltage or power. These however are too expensive for a number of uses, such as for example small vehicles as snow scooters.

SUMMARY OF THE INVENTION

It is an object of this invention to decrease the equipment required for regulating the output voltage of such generators to a minimum.

It must of course be noted that the requirements for these generators are not particularly stringent. However the battery charging arrangement must be very reliable and able to withstand difficult operating conditions and a minimum of maintenance without breakdown.

In accordance with this invention, the output windings of an alternator are connected by switching means in such a manner that the output windings are connected in a Y connection when a high load is present and are connected in series under low load conditions.

The type of rectifier used is preferably a three-phase bridge rectifier.

In these battery arrangements, a switch is generally provided for connecting into the circuit an additional load, for example during the night, such as light. In accordance with the present invention, switching means are provided which act in conjunction with the additional load switching means and serve to connect the output windings of the alternator in a Y connection when the additional switching means is closed and in series when the additional load switching means is open. The additional load switching means may be coupled to the output winding switching means mechanically, or electromagnetic activation may be used. A control element may be connected directly to receive the D.C. output voltage of the alternator after rectification and the switching means switching the alternator windings can be activated directly in response to changes in this voltage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE shows a battery charging arrangement in accordance with the present invention.

DESCRIPTION OF THE PREFERRED EMBODIMENT

The preferred embodiment of the invention will now be described with reference to the FIGURE. The FIGURE shows a battery charging arrangement wherein an alternator has three output windings, namely windings $1a$, $1b$, and $1c$. Each of these windings has a first and second end point. The first end point of winding $1b$ is connected to a contact $8a$ of the switching means. This contact is in turn connected to a movable arm $8b$ which, as shown in the FIGURE, is connected to a fixed contact $8c$ which in turn is connected to a point 10 which forms the center point of the Y connection. The first end point of winding $1a$ and the first end point of winding $1c$ are also connected to this common point. The second end point of windings $1a$ and $1b$ are connected to A.C. terminals $3a$ and $3b$. Terminals $3a$ and $3b$ are connected to two branches of a three-phase bridge rectifier arrangement which comprises six rectifiers all together, namely rectifiers $2a$, $2b$, $2c$, $2a'$, $2b'$ and $2c'$. The second end point of winding $1c$ is connected to a first pair of contacts which are normally closed when the alternator is operating with an additional load, which is the case shown in the FIGURE The contact of this pair of contacts are labeled $9a$ and $9c$ and are bridged by a movable arm $9d$. The terminal $9c$ is directly connected to the third branch of the three-phase bridge rectifier. The second winding of end point $1c$ is further connected directly to a fixed contact $8d$ of a double-throw switch 8, which also forms part of the switching means. The battery is connected across terminals 11 and 12 at which the D.C. output voltage of the alternator-rectifier arrangement is furnished. Specifically, terminal 12 is connected to ground potential and the negative side of the battery to be charged. A load 5 is connected in parallel with the battery and may for example comprise the load during day use of the vehicle.

An additional load represented by a resistance 6 may be connected into the circuit by closing a switch 7 having two fixed contacts $7a$ and $7c$ which are bridged by a movable arm $7b$ when closed.

Switches 7, 8 and 9 are intercoupled mechanically. However, this mechanical coupling may be replaced by electromagnetic coupling and further it is possible that the switching means are so constructed that the switching of the output windings from a Y to a series connection and vice versa can take place via electromagnetic means in direct dependence upon the D.C. output voltage of the generator.

In the circuitry described above, the output windings 1a, 1b and 1c of the alternator are connected in a Y connection when switch 7 is closed. The output power of the generator is subjected to a three-phase bridge rectification and is applied to battery 4 as well as to first load 5 and additional load 6 at D.C. output terminals 11 and 12. The generator is so designed that its output voltage when in Y connection stays within a predetermined value even for high operating speeds.

For low generator loads, that is with switch 7 open, this arrangement operates as follows. When switch 7 is opened, that is when the additional load is removed, contact 8b of the switching means is moved from terminal 8c to terminal 8d. Simultaneously, removable arm 9b serves to open switch 9, i.e., the contact between the first pair of contacts 9a and 9c. Thus the alternator now has three windings connected in series as follows. Starting, for example at terminal 3a, winding 1a is connected in series with winding 1c which in turn is connected in series with winding 1b via contact 8a, movable arms 8b, and contact 8d. The other end of winding 1b is connected to terminal 3b which is the other A.C. terminal of the rectifier arrangement. The single-phase voltage induced in output windings 1a, 1b, and 1c is fed to the bridge rectifier arrangement comprising rectifiers 2a, 2b, 2a', and 2b'. After rectification, this voltage is then furnished to load 5 and battery 4. The maximum current drawn in this circuit connection is substantially lower than when the additional load is also connected in the circuit. However, even under such low load conditions, the voltage does not tend to become so high that an overload of the battery or damage to the lamps (constituting the load) may result.

It will be noted that in accordance with the above-described circuit, it is not necessary to provide separate windings for day or night operation of the generator, that is for low and high loads. The power limiting for low loads is much more effective than if one phase of a three-phase system is disconnected. In addition, excessively high voltages cannot result from excessively high speeds and, in spite of this, the battery is charged sufficiently even if the vehicle is proceeding very slowly.

The invention may be used equally well with permanent magnet energized generators as for generators having a separate field winding. The voltage control can also be improved by use of a voltage regulator. In the FIGURE, this voltage regulator is indicated by dashed lines. Thus, between the D.C. terminals 11 and 12, a voltage divider having resistors 13 and 14 may be connected. This voltage divider has a tap $a$. A controlled rectifier 17 has an anode connected to the second end point of winding 1a, and a cathode connected to ground potential. The control electrode of controlled rectifier 17 is connected to voltage divider tap $a$ with a constant voltage diode 15 in series with a diode 16. It is the purpose of diode 16 to prevent reverse current from flowing through the control circuit of rectifier 17.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for charging a battery in dependence on the load being supplied by the battery, comprising a first load connected with the battery; an additional load; A.C. generator means for charging the battery, and including first, second and third output windings; and switching means for connecting said additional load in circuit with the battery and automatically therewith connecting said windings in Y-formation, and for alternatively disconnecting said additional load from the battery and automatically therewith connecting said windings in series to form a single branch of a mesh including the battery so that one and the same current flows through said windings.

2. An arrangement as defined in claim 1; and further comprising rectifying means, connected between the battery and said windings, for permitting the flow of current from said winding in only one direction through said battery.

3. An arrangement for charging a battery having a load, in dependence on the absence or presence of an additional load, comprising in combination A.C. generator means having a first, second and third winding, and each winding having a first and second end point, and wherein said first endpoints of said first and second winding are connected to a common point; first switching means connecting said first, second and third winding in Y-connection in the presence of said additional load and in series in the absence of said additional load, and being connected to said second end point of said second winding, said common point and said first end point of said third winding; rectifier means comprising a first, second and third rectifier element, and said first switching means comprising a first pair of contacts connecting said second end point of said second winding to said third rectifier element; means connecting said second end point of said first winding and said second end point of said third winding directly to said first and second rectifier elements respectively; additional-load switching means connecting said additional load when closed and disconnecting said additional load when open; means coupling said additional-load switching means to said first switching means in such a manner that said first switching means is operated in dependence upon the operation of said additional-load switching means, and wherein said first pair of contacts of said first switching means comprise contacts normally closed when said additional-load switching means is closed, and wherein said first switching means further comprises double-throw switching means connecting said first end point of said third winding to said common point when said additional-load switching means is closed and connecting said first end point of said third winding to said second end point of said second winding when said additional-load switching means is open.

4. An arrangement as defined in claim 3; further comprising voltage regulating means associated with said A.C. generator means.

* * * * *